United States Patent [19]
Carini et al.

[11] 3,791,835
[45] Feb. 12, 1974

[54] SEMI-SILICA PLASTIC REFRACTORY COMPOSITION
[75] Inventors: George F. Carini, Pittsburgh; George H. Williams, Cheswick; Richard Orman Burhans, Irwin, all of Pa.
[73] Assignee: Dresser Industries, Inc., Dallas, Tex.
[22] Filed: June 4, 1973
[21] Appl. No.: 366,386

Related U.S. Application Data
[63] Continuation-in-part of Ser. No. 225,287, Feb. 10, 1972, which is a continuation-in-part of Ser. No. 66,627, Aug. 24, 1970, abandoned.

[52] U.S. Cl. .................................. 106/68, 106/69
[51] Int. Cl. ............................................ C04b 35/14
[58] Field of Search.......................... 106/67, 68, 69

[56] References Cited
UNITED STATES PATENTS
2,384,180   9/1945   Kraner ................................. 106/68

Primary Examiner—James E. Poer

[57] ABSTRACT

Semi-silica plastic refractory comprising crude flint clay, quartzite, and a plastic bond clay.

5 Claims, No Drawings

SEMI-SILICA PLASTIC REFRACTORY COMPOSITION

This application is a continuation-in-part of U.S. Ser. No. 225,287, filed Feb. 10, 1972, which was a continuation-in-part of U.S. application Ser. No. 66,627, filed Aug. 24, 1970 and assigned to the assignee of the present invention and now abandoned.

This invention relates to plastic refractory compositions and to their methods of manufacture. More particularly, this invention pertains to improved semi-silica plastic refractory compositions suitable for ramming into place to form monolithic linings in high temperature furnaces.

Semi-silica compositions (that is, those analyzing at least about 72% silica) are well known for their ability to withstand soaking heats under load, attack by alkalies, and also for volume stability on heating and cooling. Conditions such as these are found in furnaces like soaking pits which operate for long periods of time at high temperatures. In addition, the monolithic walls support the cover as well as their own weight.

Heretofore, the typical composition of plastic refractories for use in the above described application areas has been a mixture of calcined flint clay, crude kyanite, bond clay and water. U.S. Pat. No. 3,285,763 teaches such a composition in which the calcined flint clay, which provides a refractory aggregate, is calcined to eliminate shrinkage, the crude kyanite provides a slight reheat expansion, and the bond clay and the water are added for bonding and teaches provide plasticity.

If crude materials could be substituted for their calcined equivalents, an economic savings would be realized due to the elimination of the calcination step. However, heretofore, the use of all crude materials has been difficult due to the clay not being sufficiently "hard" to withstand the crushing action of the mullers during mixing and impact during installation. In addition, the crude clays are not resistant to slaking on exposure to water. A further problem with the use of a batch in which all of the clay is crude is that this causes an excessive shrinkage of the composition upon firing. In addition, good resistance to load subsidence is very difficult to obtain in unburned plastic specialties consisting entirely of crude material.

However, the present invention has overcome these above mentioned problems by proper selection and proportioning of crude clays and the various silica materials. It has been found that a dimensionally stable, semi-silica ramming mix composed entirely of crude materials can be made by counteracting the natural shrinkage of the crude clays with a correct amount of free silica in the form of quartz. The quartz imparts a permanent (linear) expansion on conversion to the high temperature crystalline form, Beta-cristobalite.

It is therefore an object of the present invention to provide a semi-silica plastic refractory composition composed of crude materials which has properties equivalent to those present compositions which contain calcined materials.

It is another object of this invention to provide a semi-silica plastic refractory composition composed of crude materials which, upon firing, forms a monolithic refractory wall of extremely low deformation under load at operating temperatures.

Various other objects and advantages will be obvious from the following description.

For the purposes of illustrative disclosure, the invention will be described with reference to several particular compositions. It is to be understood, however, that in the light of the present disclosure, those skilled in the art will be able to apply the invention to other compositions as well, without exercise of inventive skill.

According to this invention, semi-silica plastic refractories are comprised of about 10 to 40% crude flint clay, 48 to 78% quartz or quartzite, and up to about 15% bond clay, preferably, about 5 to 12%.

Preferably, the overall batch analyzes, on a dry basis, from about 72 to 90% $SiO_2$, 7 to 22% $Al_2O_3$, less than about 0.2% alkalies ($Na_2O + K_2O + Li_2O$) and the balance incidental impurities. The crude flint clay is typically sized minus 3 mesh, while the quartzite is partially added as minus 3 mesh and partially as minus 200 mesh.

Numerous bond clays are suitable according to this invention so long as the alkali oxide content is less than about 0.4%. Although the presence of a bond clay increases the plasticity of the mix, it is not required as a plasticizer as in a high calcined mix. The primary functions of the bond clay are to reduce the total alkali content of the mix and to balance, along with the crude flint clay, the permanent expansion resulting from the conversion of quartz to Beta-cristobalite on firing. Both the crude flint and bond clays exhibit a permanent linear shrinkage on firing.

Preferably, the crude flint clay and bond clay used in the practice of this invention typically analyzes:

|  | Crude Flint Clay | Bond Clay |
|---|---|---|
| Silica ($SiO_2$) | 40 to 45% | 58.0% |
| Alumina ($Al_2O_3$) | 38 to 43% | 27.0% |
| Titania ($TiO_2$) | 2 to 3% | 1.5% |
| Iron Oxide ($Fe_2O_3$) | Less than 1.5% | 1.4% |
| Lime (CaO) | Less than 0.3% | .1% |
| Magnesia (MgO) | Less than 0.4% | .04% |
| Alkalies ($Na_2O + K_2O + Li_2O$) | Less than 0.6% | 0.4% |
| Ignition loss | Balance | |

The following examples are illustrative of the teachings of the invention art. In the examples, all percentages are by weight.

Materials were weighed and then thoroughly mixed and tempered with 5 to 15% water in a muller-type mixer and pressed into 9"×4.5"×2.5" specimens at about 1,000 p.s.i. Thereafter, the shapes were dried at 250° F. and subjected to the typical tests for plastic refractories. Compositions and the results of these tests are shown in Table I below.

TABLE I

| Example: | I | II | III | IV |
|---|---|---|---|---|
| Crude Flint Clay | 28% | 14% | —% | 32% |
| Calcined Flint Clay | — | 14 | 28 | — |
| Quartzite | 60 | 60 | 60 | 60 |
| Ball Clay | 12 | 12 | 12 | 5 |
| Bulk Density, pcf |  |  |  |  |
| After Drying 18 hours at 250°F.: | 130 | 133 | 136 | 130 |
| After Heating 15 hours to 1500°F.: | 122 | 126 | 130 | |

TABLE I—Continued

| Example: | I | II | III | IV |
|---|---|---|---|---|
| After Heating 15 hours to 2550°F.: | 114 | 117 | 121 | |
| After Heating 5 hours at 2550°F.: | | | | 116 |
| Modulus of Rupture, psi (ASTM Test C-133-55) | | | | |
| After Drying at 230°F.: | 300 | 310 | 380 | |
| After Drying at 250°F.: | | | | 280 |
| After Heating to 1500°F.: | 44 | 40 | 50 | |
| After Heating to 2550°F.: | 45 | 140 | 50 | |
| After Heating at 2550°F.: | | | | 50 |
| Linear Change from Mold Size,% | | | | |
| After Heating 5 hours to 2550°F.: | +0.9 | +1.9 | +2.5 | |
| After Heating 5 hours at 2550°F.: | | | | +1.1 |
| Load Subsidence (25 psi for 90 Min.) At: | | | | |
| 2460°F.: | 1.2 | 0.2 | −0.3 | −0.8 |
| Chemical Analysis (Percentage) | | | | |
| $SiO_2$ | 81.6 | | | |
| $Al_2O_3$ | 16.6 | | | |
| $TiO_2$ | 1.0 | | | |
| $Fe_2O_3$ | 0.4 | | | |
| CaO | 0.1 | | | |
| MgO | 0.1 | | | |
| Alkalies | 0.2 | | | |

Example I is the best mode now known for the practice of this invention and is shown in comparison with mixes containing a 50 and 100% substitution of calcined flint clay for the crude flint clay.

As can be seen, the properties of the mixes are similar except that Example I has a lower, yet still acceptable strength while exhibiting less dimensional change after heating to 2,550° F.

In the preferred composition, the 60% free silica addition comes from two sources. Approximately 40% was added as minus 3-mesh novaculite (a polycrystallized quartz) and the remaining 20% was added as minus 200-mesh potters flint. Both of these materials are composed of over 99% plus free silica in the form of quartz and have an extremely low (i.e., .03%) total alkali content. The use of this finer portion of quartz is believed important in obtaining a better packing density leading to improved properties.

A permanent linear expansion results as quartz progressively converts to the high temperature crystalline form (Beta-cristobalite) on firing. It compensates for the shrinkage of the crude clay materials, thus achieving a dimensionally stable composition.

Minor amounts of calcined clays, other crude clays, aluminum silicate minerals and aluminum ores may be included in the plastic refractory compositions without departing from the scope of this invention as long as the materials do not deleteriously affect the properties of the composition. While crude or unburned quartzite is used in the examples, calcined quartzite may in some instances be more economic and could be used for some portion of the mix.

The embodiments of the invention in which an exclusive property or privilege is claimed are defined as follows:

1. A plastic refractory material consisting essentially of from about 10 to 40%, by weight, crude flint clay, 48 to 78% quartzite, and about 5 to 12% of a bond clay.

2. A plastic refractory according to claim 1 which analyzes on a dry basis, between about 72 to 90%, by weight, silica, 7 to 22% alumina, less than about 0.2%, by weight, alkalies and incidental impurities.

3. A plastic refractory material according to claim 1, in which the crude flint clay typically analyzes 40 to 45% $SiO_2$, 38 to 43% $Al_2O_3$, less than 0.6% alkalies and incidental impurities.

4. A plastic refractory material according to claim 1 wherein the quartzite is a combination of potters flint and novaculite.

5. A plastic refractory material consisting essentially of (a) crude flint clay, (b) quartzite and (c) bond clay, the quantities of the above being (a) about 10 to 40%, (b) about 48 to 78% and (c) an effective amount up to 15%.

* * * * *